United States Patent
Manu et al.

(10) Patent No.: US 10,484,352 B2
(45) Date of Patent: Nov. 19, 2019

(54) DATA OPERATIONS USING A PROXY ENCRYPTION KEY

(71) Applicant: Microsoft Technology Licensing, LLC, Redmond, WA (US)

(72) Inventors: Mitica Manu, Sammamish, WA (US); Baskar Sridharan, Sammamish, WA (US); Raghunath Ramakrishnan, Bellevue, WA (US); Sriram K. Rajamani, Bangalore (IN); Victor V. Boyko, Brooklyn, NY (US); Pushkar Vijay Chitnis, Bellevue, WA (US); Shastry M. C. Shankara, Bangalore (IN); Ramarathnam Venkatesan, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 189 days.

(21) Appl. No.: 15/616,392

(22) Filed: Jun. 7, 2017

(65) Prior Publication Data
US 2018/0288020 A1    Oct. 4, 2018

(30) Foreign Application Priority Data
Mar. 31, 2017 (IN) .............................. 201741011742

(51) Int. Cl.
*H04L 29/06* (2006.01)
*G06F 12/14* (2006.01)
(Continued)

(52) U.S. Cl.
CPC .......... *H04L 63/06* (2013.01); *G06F 12/1408* (2013.01); *G06F 21/602* (2013.01);
(Continued)

(58) Field of Classification Search
CPC ..... H04L 63/06; H04L 63/08; H04L 63/0428; H04L 63/0884; H04L 9/08; H04L 9/0861;
(Continued)

(56) References Cited

U.S. PATENT DOCUMENTS 7,978,856 B2   7/2011   Cho et al.
8,116,456 B2   2/2012   Thomas
(Continued)

OTHER PUBLICATIONS

"Managed Key Encryption—InterSystem", http://docs.intersystems.com/latest/csp/docbook/DocBook.UI.Page.cls?KEY=GCAS_encrypt, Published on: Oct. 26, 2016, 23 pages.
(Continued)

*Primary Examiner* — Hosuk Song
(74) *Attorney, Agent, or Firm* — Workman Nydegger (57) ABSTRACT

Operating upon encrypted data with a particular data scope. A base encryption key is established and associated with the particular data scope, and then stored in a base encryption key store. That base encryption key store might be managed by an application or service that stores base encryption keys for multiple data scopes. A proxy encryption key acts as a kind of proxy for the base encryption key. The proxy encryption key may be used for frequent operations on encrypted data within the particular data scope. Thus, the principles described herein act as a frequency amplifier that allows key-based operations upon the particular data scope to be performed at much higher frequencies than otherwise would be possible by operating directly using the base encryption key.

20 Claims, 4 Drawing Sheets

(51) Int. Cl.
*H04L 9/08* (2006.01)
*G06F 21/60* (2013.01)
*G06F 21/62* (2013.01)
*H04L 9/06* (2006.01)

(52) U.S. Cl.
CPC ........ *G06F 21/6281* (2013.01); *H04L 9/0861* (2013.01); *H04L 63/0428* (2013.01); *H04L 63/064* (2013.01); *G06F 2212/1052* (2013.01); *H04L 9/0618* (2013.01); *H04L 63/0884* (2013.01)

(58) Field of Classification Search
CPC . H04L 9/0816; H04L 9/0838; G06F 12/1408; G06F 21/62; G06F 2212/1052
USPC .................. 713/168, 171, 189, 193; 380/277
See application file for complete search history.

(56) References Cited

U.S. PATENT DOCUMENTS

| | | | |
|---|---|---|---|
| 8,285,993 B1 * | 10/2012 | Subramanian | H04L 9/0841 380/229 |
| 8,731,203 B2 * | 5/2014 | D'Souza | H04L 9/085 380/277 |
| 8,929,554 B2 | 1/2015 | Hughes et al. | |
| 9,002,018 B2 * | 4/2015 | Wilkins | H04L 9/006 380/281 |
| 9,026,805 B2 | 5/2015 | Acar et al. | |
| 9,154,488 B2 * | 10/2015 | Innes | H04L 63/08 |
| 9,197,410 B2 * | 11/2015 | Yoshida | H04L 9/0825 |
| 9,258,121 B2 | 2/2016 | Ali et al. | |
| 9,288,054 B2 | 3/2016 | Han et al. | |
| 9,344,276 B2 * | 5/2016 | Kawai | H04L 9/0861 |
| 9,407,432 B2 | 8/2016 | Uzun | |
| 9,450,927 B2 | 9/2016 | Pelly et al. | |
| 2010/0098255 A1 | 4/2010 | Ciet et al. | |
| 2013/0151400 A1 | 6/2013 | Makhotin et al. | |
| 2016/0182470 A1 | 6/2016 | Rubin et al. | |
| 2018/0349631 A1 | 12/2018 | Illendula et al. | |

OTHER PUBLICATIONS

"Final Office Action Issued in U.S. Appl. No. 15/617,935", dated Sep. 18, 2019, 13 Pages.

* cited by examiner

DATA OPERATIONS USING A PROXY ENCRYPTION KEY

BACKGROUND

Computing systems and associated networks have greatly revolutionized our world ushering in what is now commonly called the "information age". Cloud computing now allows many user entities to use applications offered as a service to those entities. However, when multiple users access cloud application, security is always of great concern. For instance, only authorized users should be able to have access to, and perform operations on, particular data.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

At least some embodiments described herein relate to operating upon encrypted data within a particular data scope. As an example, the data scope might be an account for a cloud computing service, such as a file system cloud service. A base encryption key is established and associated with the particular data scope, and then stored in a base encryption key store. That base encryption key store might be managed by an application or service that stores base encryption keys for multiple data scopes (e.g., multiple accounts). However, often base encryption key stores in the cloud are not equipped for frequent requests for operations that use the base encryption key. This is because such applications were originally established for management of data, rather than large scale and/or high performance operations on encrypted data.

The principles described herein use a proxy encryption key that acts as a kind of proxy for the base encryption key. The proxy encryption key may be used for frequent operations on encrypted data within the particular data scope. Thus, the principles described herein act as a frequency amplifier that allows key-based operations upon the particular data scope to be performed at much higher frequencies than otherwise would be possible by operating directly using the base encryption key.

The proxy encryption key is established and also associated with the particular data scope. The proxy encryption key is then encrypted using the base encryption key. Optionally, the encrypted proxy encryption key is also signed using a master encryption key. The encrypted (and potentially also signed) proxy encryption key is then stored in a proxy encryption key store. Then, when multiple operations are to be performed on the particular data scope, the first operation might involve potentially checking the signature of the encrypted proxy encryption key to ensure the encrypted encryption key has not been tampered with, and acquiring the decrypted form of the proxy encryption key (using the application that has access to the base encryption key, and thus which may provide the decrypted form of the proxy encryption key), and placing the decrypted form of the proxy encryption key in a more local cache or store (hereinafter referred to as a "protected cache") that is protected from access from external applications. In some embodiments, such protection may be obtained by re-encrypting the proxy encryption key using another encryption key that is available to the application that has access to the proxy encryption key store.

This, of course, means that there is one key operation performed on the base encryption key store. However, for subsequent operations, until the decrypted form of the proxy encryption key is removed from the protected cache (e.g., either intentionally or in response to some policy, such as an expiration), the copy of the proxy encryption key in the protected cache may be used to perform the various operations. Thus, no further (or little further) key operation requests are required to be made to the actual application that manages the base encryption key. Thus, by using the proxy encryption key as a proxy for the base encryption key, more frequency key-based operations may be performed on the particular data scope.

Furthermore, security may be managed at many levels. For instance, authorization to use a base encryption key may suspended temporarily, which eliminates any chance to operate in the particular data scope after the copy of the proxy encryption key is removed from the protected cache. The base encryption key may also be deleted resulting in garbage collection of even the encrypted proxy encryption key that is stored in the proxy encryption key store. Likewise, the master signing key may be used when making requests to the application that manages the base encryption keys. Furthermore, the master signing key may also be suspended or deleted to eliminate access to the proxy encryption key.

In some embodiments, the particular data scope is divided into portions, where each portion is stored in encrypted form, and is encrypted by a unique encryption key (i.e., a "portion encryption key") that is derivable from the proxy encryption key. Thus, discovery of a portion encryption key will thus limit the divulging of information to only that corresponding portion of the particular data scope.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

At least some embodiments described herein relate to operating upon encrypted data within a particular data scope. As an example, the data scope might be an account for a cloud computing service, such as a file system cloud service. A base encryption key is established and associated with the particular data scope, and then stored in a base encryption key store. That base encryption key store might be managed by an application or service that stores base encryption keys for multiple data scopes (e.g., multiple accounts). However, often base encryption key stores in the cloud are not equipped for frequent requests for operations that use the base encryption key. This is because such applications were originally established for management of data, rather than large scale and/or high performance operations on encrypted data.

The principles described herein use a proxy encryption key that acts as a kind of proxy for the base encryption key. The proxy encryption key may be used for frequent operations on encrypted data within the particular data scope. Thus, the principles described herein act as a frequency amplifier that allows key-based operations upon the particular data scope to be performed at much higher frequencies than otherwise would be possible by operating directly using the base encryption key.

The proxy encryption key is established and also associated with the particular data scope. The proxy encryption key is then encrypted using the base encryption key. Optionally, the encrypted proxy encryption key is also signed using a master encryption key. The encrypted (and potentially also signed) proxy encryption key is then stored in a proxy encryption key store. Then, when multiple operations are to be performed on the particular data scope, the first operation might involve potentially checking the signature of the encrypted proxy encryption key to ensure the encrypted encryption key has not been tampered with, and acquiring the decrypted form of the proxy encryption key (using the application that has access to the base encryption key, and thus which may provide the decrypted form of the proxy encryption key), and placing the decrypted form of the proxy encryption key in a more local cache or store (hereinafter referred to as a "protected cache") that is protected from access from external applications. In some embodiments, such protection may be obtained by re-encrypting the proxy encryption key using another encryption key that is available to the application that has access to the proxy encryption key store.

This, of course, means that there is one key operation performed on the base encryption key store. However, for subsequent operations, until the decrypted form of the proxy encryption key is removed from the protected cache (e.g., either intentionally or in response to some policy, such as an expiration), the copy of the proxy encryption key in the protected cache may be used to perform the various operations. Thus, no further (or little further) key operation requests are required to be made to the actual application that manages the base encryption key. Thus, by using the proxy encryption key as a proxy for the base encryption key, more frequency key-based operations may be performed on the particular data scope.

Furthermore, security may be managed at many levels. For instance, authorization to use a base encryption key may suspended temporarily, which eliminates any chance to operate in the particular data scope after the copy of the proxy encryption key is removed from the protected cache. The base encryption key may also be deleted resulting in garbage collection of even the encrypted proxy encryption key that is stored in the proxy encryption key store. Likewise, the master signing key may be used when making requests to the application that manages the base encryption keys. That master signing key may also be suspended[ABi] or deleted to eliminate access to the proxy encryption key.

In some embodiments, the particular data scope is divided into portions, where each portion is stored in encrypted form, and is encrypted by a unique encryption key (i.e., a "portion encryption key") that is derivable from the proxy encryption key. Thus, discovery of a portion encryption key will thus limit the divulging of information to only that corresponding portion of the particular data scope.

Because the principles described herein operate in the context of a computing system, a computing system will be described with respect to FIG. 1. Then, the principles of performing secure operations on a particular data scope using a base encryption key, and more frequent accesses to a proxy encryption key that acts as a proxy for the base encryption key, will be described with respect to FIGS. 2 through 8.

Computing systems are now increasingly taking a wide variety of forms. Computing systems may, for example, be handheld devices, appliances, laptop computers, desktop computers, mainframes, distributed computing systems, datacenters, or even devices that have not conventionally been considered a computing system, such as wearables (e.g., glasses, watches, bands, and so forth). In this description and in the claims, the term "computing system" is defined broadly as including any device or system (or combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

Figure 1:
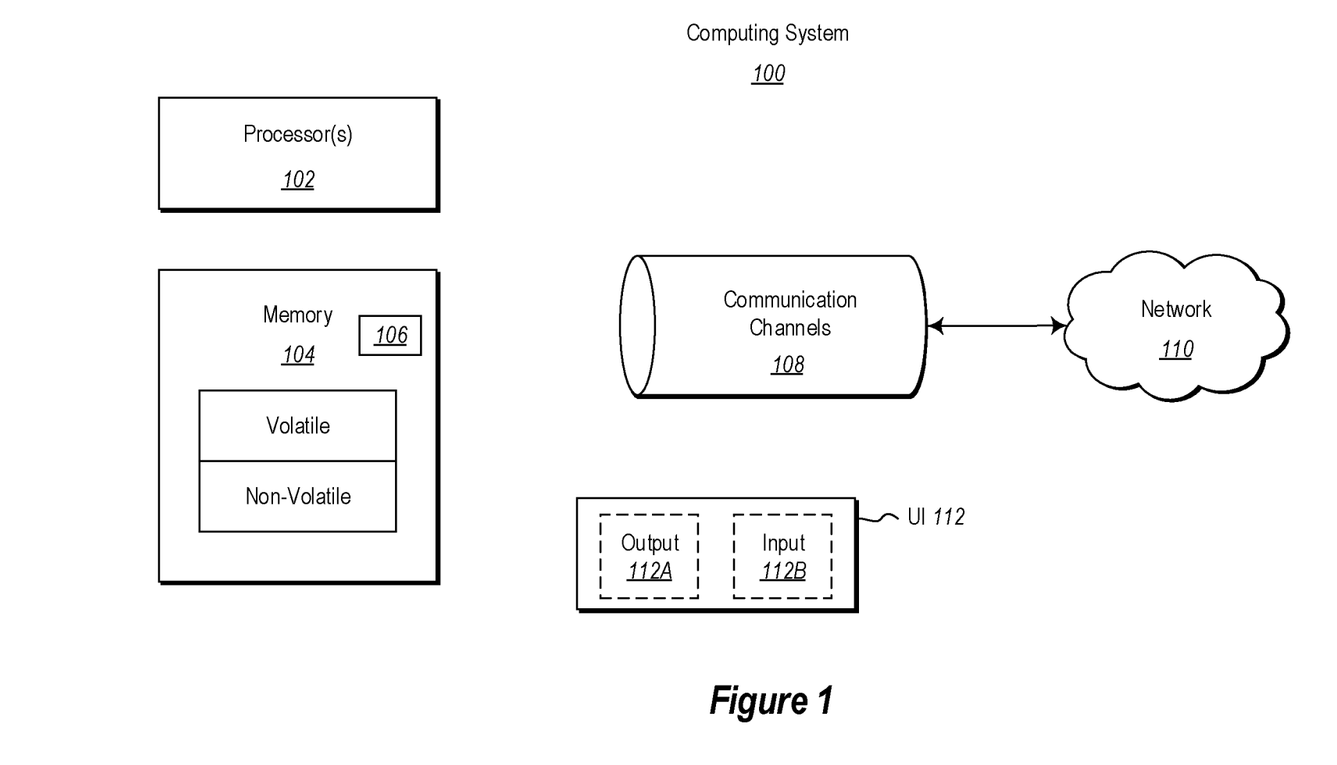
FIG. 1 illustrates an example computer system in which the principles described herein may be employed.

As illustrated in FIG. 1, in its most basic configuration, a computing system 100 typically includes at least one hardware processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

The computing system 100 has thereon multiple structures often referred to as an "executable component". For instance, the memory 104 of the computing system 100 is illustrated as including executable component 106. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods that may be executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such structure may be computer-readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the term "component" may also be used. As used in this description and in the case, this term (regardless of whether the term is modified with one or more modifiers) is also intended to be synonymous with the term "executable component" or be specific types of such an "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data.

The computer-executable instructions (and the manipulated data) may be stored in the memory 104 of the computing system 100. Computing system 100 may also contain communication channels 108 that allow the computing system 100 to communicate with other computing systems over, for example, network 110.

While not all computing systems require a user interface, in some embodiments, the computing system 100 includes a user interface 112 for use in interfacing with a user. The user interface 112 may include output mechanisms 112A as well as input mechanisms 112B. The principles described herein are not limited to the precise output mechanisms 112A or input mechanisms 112B as such will depend on the nature of the device. However, output mechanisms 112A might include, for instance, speakers, displays, tactile output, holograms, virtual reality, and so forth. Examples of input mechanisms 112B might include, for instance, microphones, touchscreens, holograms, virtual reality, cameras, keyboards, mouse of other pointer input, sensors of any type, and so forth.

Embodiments described herein may comprise or utilize a special purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computing system. Computer-readable media that store computer-executable instructions are physical storage media. Computer-readable media that carry computer-executable instructions are transmission media. Thus, by way of example, and not limitation, embodiments can comprise at least two distinctly different kinds of computer-readable media: storage media and transmission media.

Computer-readable storage media includes RAM, ROM, EEPROM, CD-ROM or other optical disk storage, magnetic disk storage or other magnetic storage devices, or any other physical and tangible storage medium which can be used to store desired program code means in the form of computer-executable instructions or data structures and which can be accessed by a general purpose or special purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmissions media can include a network and/or data links which can be used to carry desired program code means in the form of computer-executable instructions or data structures and which can be accessed by a general purpose or special purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then eventually transferred to computing system RAM and/or to less volatile storage media at a computing system. Thus, it should be understood that readable media can be included in computing system components that also (or even primarily) utilize transmission media.

Computer-executable instructions comprise, for example, instructions and data which, when executed at a processor, cause a general purpose computing system, special purpose computing system, or special purpose processing device to perform a certain function or group of functions. Alternatively, or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses or watches) and the like. The invention may also be practiced in distributed system environments where local and remote computing systems, which are linked (either by hardwired data links, wireless data links, or by a combination of hardwired and wireless data links) through a network, both perform tasks. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

For instance, cloud computing is currently employed in the marketplace so as to offer ubiquitous and convenient on-demand access to the shared pool of configurable computing resources. Furthermore, the shared pool of configurable computing resources can be rapidly provisioned via virtualization and released with low management effort or service provider interaction, and then scaled accordingly.

A cloud computing model can be composed of various characteristics such as on-demand self-service, broad network access, resource pooling, rapid elasticity, measured service, and so forth. A cloud computing model may also come in the form of various service models such as, for example, Software as a Service ("SaaS"), Platform as a Service ("PaaS"), and Infrastructure as a Service ("IaaS"). The cloud computing model may also be deployed using different deployment models such as private cloud, community cloud, public cloud, hybrid cloud, and so forth. In this description and in the claims, a "cloud computing environment" is an environment in which cloud computing is employed.

Figure 2:
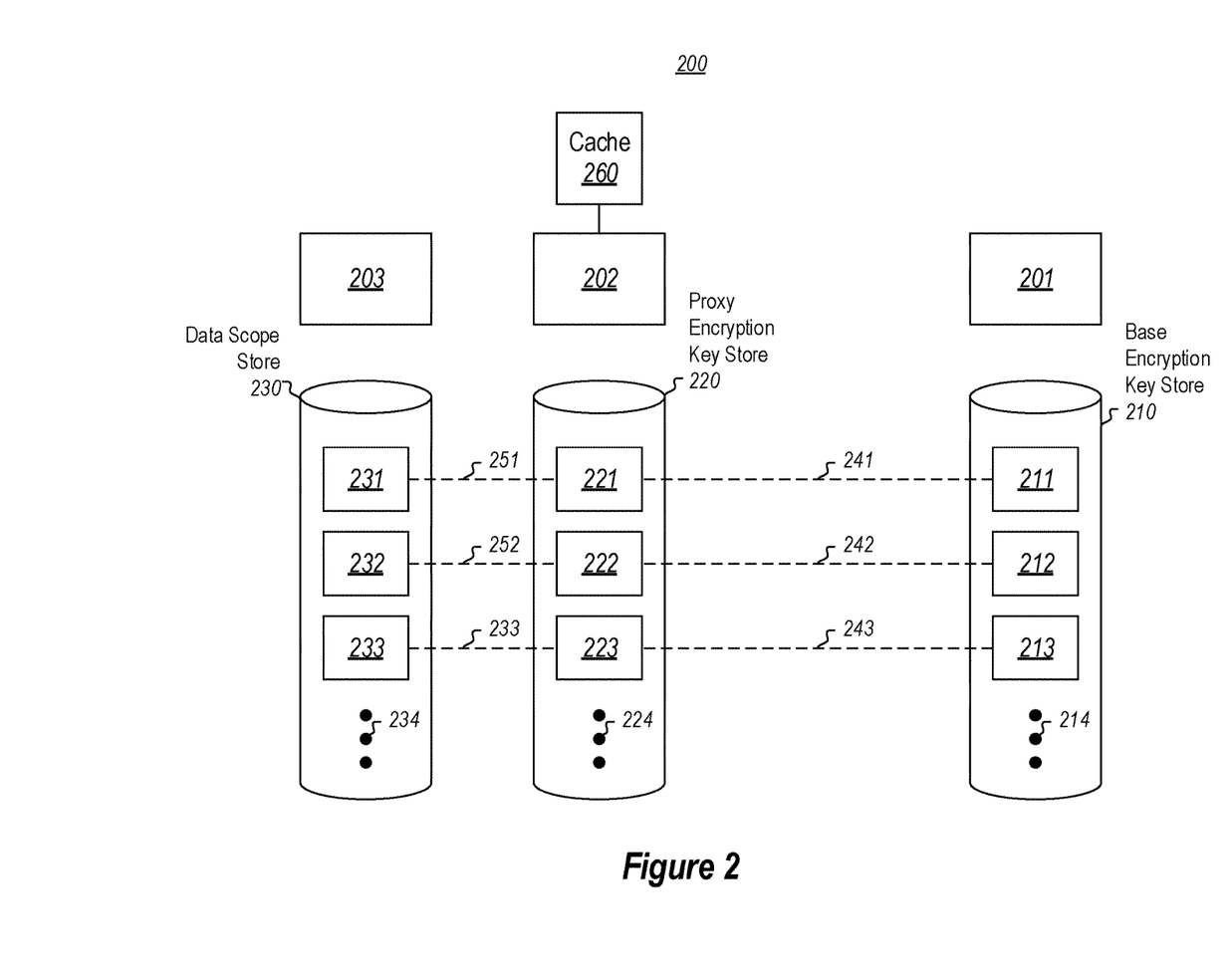
FIG. 2 illustrates an environment in which the principles described herein may be employed, and which includes an application that manages a base encryption key store, and an application that manages a proxy encryption key store and has access to a data scope store having multiple scopes.

FIG. 2 illustrates an environment 200 in which the principles described herein may be employed. The environment include an application 201 that manages a base encryption key store 210, an application 202 that manages a proxy encryption key store 220, and an application 203 that manages a data scope store 230. The application 201 and base encryption key store 210 may operate upon a computing system such as the computing system 100 described with respect to FIG. 1. The application 202 and the proxy encryption key store 220 may also operate upon a computing system such as the computing system 100 described with respect to FIG. 1. Likewise, the application 203 and the data scope store 230 may also operate upon a computing system such as the computing system 100 described with respect to FIG. 1.

The base encryption key store 210 is illustrated as including three base encryption keys 211, 212 and 213 for purposes of example only. The ellipses 214 represents that the base encryption key store 210 may include any number of base encryption keys from as few as one, to potentially an enumerable number of base encryption keys. Similarly, the proxy encryption key store 220 is illustrated as including three proxy encryption keys 221, 222 and 223 for purposes of example only. The ellipses 224 represents that the proxy encryption key store 220 may include any number of proxy encryption keys from as few as one, to potentially an enumerable number of proxy encryption keys.

There is also an application 203 that manages a data scope store 230 that includes data of multiple scopes. For instance, the data scope store 230 is illustrated as including data from three data scopes 231, 232 and 233 for purposes of example only. The ellipses 234 represents that the data scope store 230 may include data from any number of data scopes from as few as one, to potentially an enumerable number of data scopes.

Each base encryption key is associated with a particular data scope. For instance, base encryption key 211 is associated with data scope 231, base encryption key 212 is associated with data scope 232, and base encryption key 213 is associated with data scope 233. There is also a proxy encryption key for each data scope. For instance, proxy encryption key 221 is associated with data scope 231, proxy encryption key 222 is associated with data scope 232, and proxy encryption key 223 is associated with data scope 233.

A proxy encryption key for any given data scope acts as a proxy for the base encryption key for that same data scope. For instance, the proxy encryption key store 220 holds proxy encryption keys that are encrypted using the corresponding base encryption key. Such encrypted proxy encryption key may optionally also be signed with a master signing key to ensure that the encrypted proxy encryption key is not tampered with. Such signing might be especially useful if the base encryption keys are a public/private key pair. The master signing key may be shared amongst all of the data scopes.

When the proxy encryption key is to be used in lieu of the base encryption key, the application 202 verifies the signature of the encrypted proxy encryption key (if signed), decrypts (with the aid of the application 201) the proxy encryption key using the corresponding base encryption key, and that decrypted form of the proxy encryption key is kept in protected cache (e.g., cache 260) for subsequent operations that use that proxy encryption key.

A protected cache may be enabled by using a cache that is available to multiple application, but simply re-encrypting the decrypted form of the proxy encryption key prior to placement in the cache. In the description and in the claims, placing or storing "the decrypted form of the proxy encryption key into the protected cache" includes this embodiment since the process of re-encryption and decryption in conjunction with an unprotected cache may collectively be considered a "protected cache", and since even the re-encrypted proxy encryption key is in a "decrypted form" in the sense that it has been previously decrypted using the base encryption key. Alternatively, the protected cache may be a cache that is managed by the application 202 and restricts access to its contents to only the application 202 or other authorized applications. In such a case, re-encryption using a different encryption key is still an option, in which case the combination of the re-encryption, associated decryption and the protected cache may also be considered as a "protected cache". Nevertheless, the re-encrypted proxy encryption key has still been decrypted using the base encryption key. Thus, within the description and the claims, such a re-encrypted proxy encryption key will be referred to herein as a "decrypted form" of the proxy encryption key.

Proxy encryption key 221 acts as a proxy for the base encryption key 211 (as represented by line 241), each being associated with the data scope 231 (as represented by lines 241 and 251). Proxy encryption key 222 acts as a proxy for the base encryption key 212 (as represented by line 242), each being associated with the data scope 232 (as represented by lines 242 and 252). Proxy encryption key 223 acts as a proxy for the base encryption key 213 (as represented by line 242), each being associated with the data scope 233 (as represented by lines 243 and 253).

In some embodiments, there is a one-to-one correspondence between base encryption keys and the proxy encryption keys, with each proxy encryption key acting as a proxy for the corresponding base encryption key as described in further detail hereinafter. However, the principles described herein may be extended to embodiments in which there are multiple proxy encryption keys for each base encryption key. Furthermore, the principles described herein may also be extended to embodiments in which a single proxy encryption key is encrypted with multiple base encryption keys. Accordingly, in this description and in the claims, when a proxy encryption key is described as being associated with a base encryption key or a particular data scope, that is not to say that the proxy encryption key is the only proxy encryption key that is associated with that base encryption key or that data scope, or that the base encryption key is the only base encryption key used to encrypt the proxy encryption key.

Although the principles described herein are not limited to any particular type of data scope, the data scope may be a data stored under an account associated with a particular user entity. For instance, the data scope store 230 may store data for many different user entities. In that case, the application 201 and/or the application 202 may be considered as a service (i.e., an application that serves multiple user entities). For instance, the services may operate within a cloud computing environment. In any case, the data within any given data scope is encrypted to prevent improper access (e.g., reading, writing, operating upon, etc.) to the data except to those entities (users and/or applications) that are authorized to access the data. Thus, the data scope store may represent a store within a cloud computing environment in which there is data for multiple customers. In some embodiments, the data may be further signed to ensure that even if the data is altered, the fact that alteration has occurred may be detected.

Figure 3:
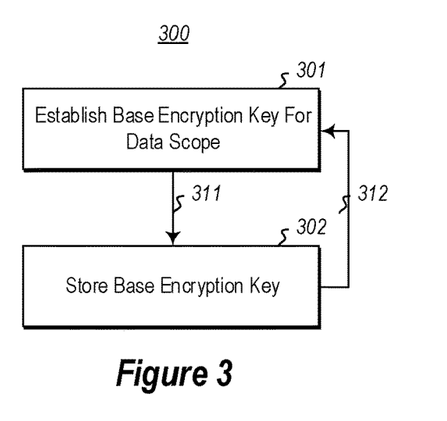
FIG. 3 illustrates a flowchart of a method for preparing to operate upon encrypted data within the various data scopes.

FIG. 3 illustrates a flowchart of a method 300 for preparing to operate upon encrypted data within the various data scopes. The method 300 may be performed, for instance, by the application 201 of FIG. 2. The method 300 includes establishing a base encryption key for a particular data scope (act 301) and storing the established base encryption key within the base key store (act 302). Because this may be performed for multiple data scopes, and multiple base encryption keys, the method 300 is illustrated as being recurring (as represented by the arrows 311 and 312). Each base encryption key is stored in the base encryption key store 210 so as not to be revealed to the applications 202 or 203. Instead, only the application 201 has access to the base encryption keys.

In the case of a particular data scope being associated with a user entity, the user entity may select or provide the base encryption key. In that case, the management policy for that base encryption key may also be configured by the user entity. Such management policy might include the lifetime of the base encryption key, the circumstances in which the base encryption key is invalidated, an identification of who has authorization to perform operations that rely on the base encryption key, and so forth. Alternatively, whether or not the particular data scope is associated with a user entity, the base encryption key (and/or the management policy for the base encryption key) may be selected and/or created by the application 201 that manages the base encryption key store 210 (possibly upon request from another component of the system, such as the application 202).

Figure 4:
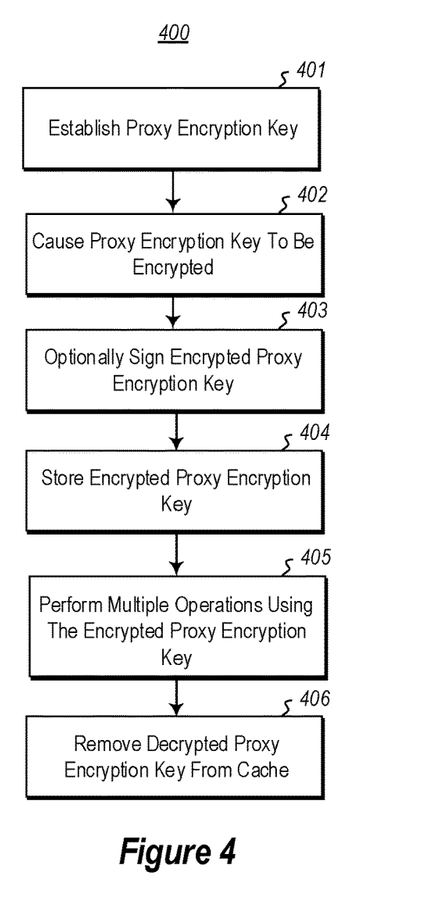
FIG. 4 illustrates a flowchart of a method for operating upon encrypted data within a particular data scope.

FIG. 4 illustrates a flowchart of a method 400 for operating upon encrypted data within a particular data scope. The method 400 of FIG. 4 may be performed within the environment 200 of FIG. 2 with respect to any data scope that has already been subject to the method 300 and thus for which there is a base encryption key established and stored within the base encryption key store. For instance, the method 400 may be performed with respect to the data scope 231, or with respect to any of the other data scopes 232 and 233. Accordingly, the method 400 of FIG. 4 will now be described with respect to the environment 200 of FIG. 2. As an example only, the method 400 will be described with respect to the data scope 231 and its associated base encryption key 211 and an associated proxy encryption key 221.

Figure 5:
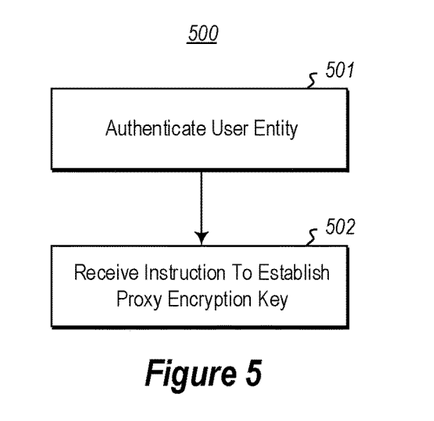
FIG. 5 illustrates a flowchart of a method for determining that a proxy encryption key is to be established and associated with the particular scope.

The method 400 for operating upon the encrypted data within a particular data scope includes establishing a proxy encryption key that is associated with the particular data scope (act 401). FIG. 5 illustrates a flowchart of a method 500 for determining that a proxy encryption key is to be established and associated with the particular scope. The method 500 may be performed in the case in which the particular data scope is associated with a user entity. The method 500 includes authenticating the user entity (act 501), and receiving an instruction to establish the proxy encryption key associated with the particular data scope (act 502). For instance, a user entity associated with the data scope 231 may authenticate to the application 202 (act 501), and thereafter instruct the application 202 to establish a proxy encryption key (e.g., proxy encryption key 221) associated with the data scope 231 (act 502).

Returning to FIG. 4, after making the determination that the proxy encryption key is to be established (either via the method 500 or in some other way), the application 202 establishes a proxy encryption key that is also associated with the particular data scope (act 401). At this point, the proxy encryption key, though not yet encrypted, is not stored, but remains in the memory of the computing system that includes the application 202. For instance, the proxy encryption key may be within the protected cache 260 associated with the application 202. In fact, whenever the proxy encryption key exists in decrypted form on the computing system associated with the application 202, the decrypted form is within the cache 260.

Figure 6:
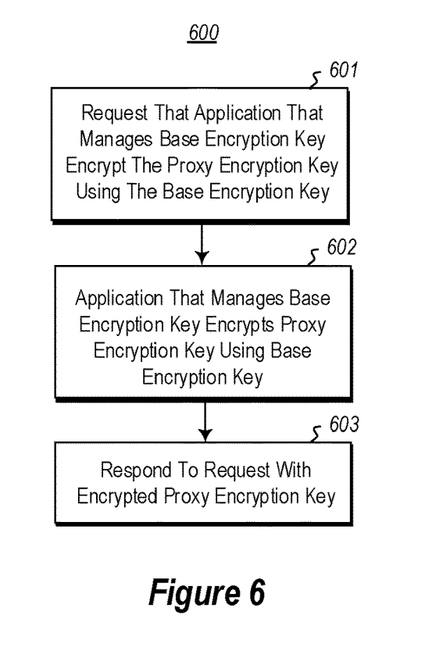
FIG. 6 illustrates a flowchart of a method for encrypting the base encryption key.

The application 202 then causes the proxy encryption key to be encrypted using the base encryption key (act 402) and potentially also signed using the master encryption key. FIG. 6 illustrates a flowchart of a method 600 for encrypting the proxy encryption key and represents an example of the act 402 of FIG. 4. Since the application 202 cannot access the base encryption key, the application 202 requests that the application 201 encrypts the proxy encryption key (act 601) (and if signing is to occur, and the application 201 is to sign the encrypted proxy encryption key, the request may be interpreted as a request to sign also). For instance, the application 202 requests that the application 201 encrypt the proxy encryption key 221. The application 201 then encrypts (and potentially signs) the proxy encryption key using the base encryption key (act 602). For instance, the application 201 then encrypts the proxy encryption key 221 using the base encryption key 211, and potentially signs the encrypted proxy encryption key using the master signing key. The application 201 then sends the encrypted proxy encryption key to the application 202 (act 603). If signing is to occur, and is to be performed by the application 202 instead, the application 202 signs the encrypted proxy encryption key. For instance, the application 201 sends the (potentially signed) encrypted proxy encryption key 221 to the application 202. Thus, the application 202 does not see the base encryption key 211.

Returning to FIG. 4, the application 202 then potentially signs the encrypted proxy encryption key (act 403), which is then stored within the proxy encryption key store (act 404). For instance, the encryption keys 221, 222 and 223 stored within the proxy encryption store are actual encrypted forms of the proxy encryption key, which are encrypted using the corresponding base encryption key 211, 212, 213, respectively. Then, multiple operations may be performed on data within the data scope using the encrypted proxy encryption key (act 405). As described with respect to FIG. 7, in this process, a decrypted form of the proxy encryption key is made available in protected cache 260. That decrypted form of the proxy encryption key is removed from the protected cache (act 406) at some point after the multiple operations are completed (act 405).

Figures 7, 8:
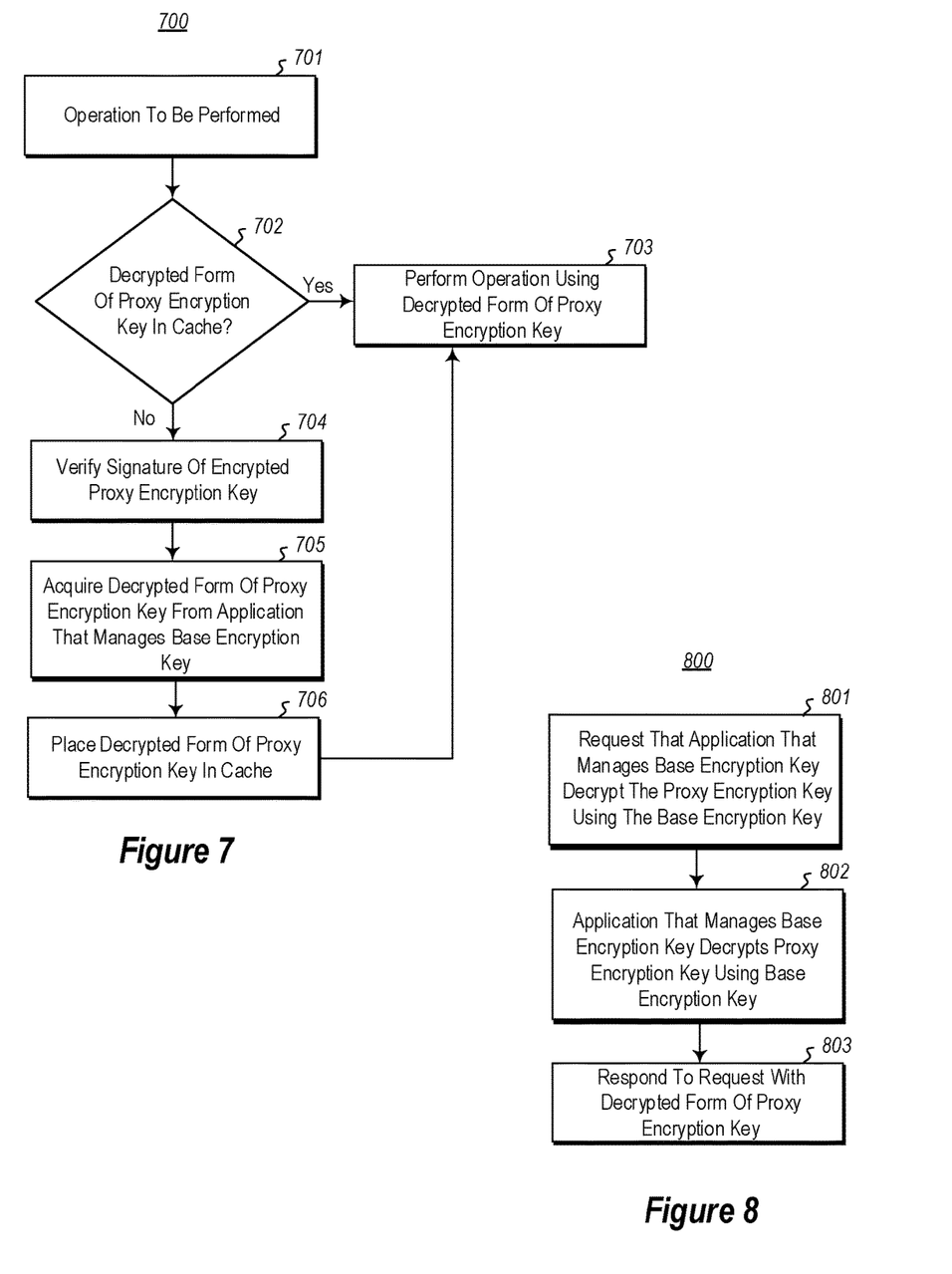
FIG. 7 illustrates a flowchart of a method for performing each the multiple operations using the encrypted proxy encryption key.
FIG. 8 illustrates a flowchart of a method for accessing a decrypted form of the proxy encryption key from an application that manages the base encryption keys.

FIG. 7 illustrates a flowchart of a method 700 for performing each of the multiple operations using the encrypted proxy encryption key, and thus represents an example of the act 405 of FIG. 4. The method 700 may be performed for each of the multiple operations. Upon determining that an operation is to be performed using the encrypted proxy encryption key (act 701), the application 202 checks to see if a decrypted form of the proxy encryption key is already in the protected cache (decision block 702). If so ("Yes" in decision block 702), the operation is performed using the already cached decrypted form of the proxy encryption key (act 703).

Otherwise, ("No" in decision block 702), the signature of the encrypted proxy encryption key is validated or verified if the key was indeed signed (act 704). This validation may be performed by either the application 201 or the application 202 depending on access to the master signing key. A decrypted form of the proxy encryption key is acquired from an application that manages the base encryption keys (act 705), and placed in the protected cache (act 706). Thereafter the operation is performed using the cached decrypted form of the proxy encryption key (act 703).

FIG. 8 illustrates a flowchart of a method 800 for accessing a decrypted form of the proxy encryption key from an application that manages the base encryption keys and represents an example of the act 704 of FIG. 7. Since the application 202 cannot access the base encryption key that is used to decrypt the proxy encryption key, the application 202 requests that the application 201 decrypt the proxy encryption key (act 601) along with the encrypted form of the proxy encryption key. For instance, the application 202 requests that the application 201 decrypt the proxy encryption key 221. The application 201 then decrypts the proxy encryption key using the base encryption key (act 802). For instance, the application 201 then decrypts the proxy encryption key 221 using the base encryption key 211. The application 201 then sends the decrypted form of the proxy encryption key to the application 202 (act 803). For instance, the application 201 sends the decrypted form of the proxy encryption key 221 to the application 202.

As an example, when the first of the multiple operations of act 405 is performed, the application 202 proceeds to acquire the decrypted form of the proxy encryption key from the application 201 (via acts 705 and 706). Thereafter, for the remainder of the operations of act 405, the decrypted form of the proxy encryption key is already available in the cache 260, foregoing the need to communicate with the application 201. For instance, if the plurality of operations involve file operations, the first operation might be to open the file. At least some of the remaining operations might involve performing operations on the opened file. In this case, the data scope might be a populated file system.

In some embodiments, the data scope may be divided into individual portions. Each different portion is also stored in encrypted form, but is encrypted using a different encryption key (also called herein a "portion encryption key"). The portion encryption key is derived using the proxy encryption key, and data or metadata associated with the portion of the data scope. Thus, having access to the proxy encryption key, and metadata for the portion, the portion encryption key may be derived and used to decrypt the portion of the data scope. Thus, if the portion encryption key is discovered, then only that portion of the data scope is found out. The remainder of the data scope is still encrypted. In one example, the size of the portion may be configured, and may perhaps be in the kilobytes or megabytes range. A file, on the other hand, may be in the gigabyte, terabyte, or even petabyte range. Thus, the decrypted form of the proxy encryption key may remain in the cache for thousands, or potentially millions of operations that use the proxy encryption key.

Thus, access to the base encryption key stored in the base encryption key store may occur at a frequency that is at least two, three or more orders of magnitude less frequent than the frequency at which the decrypted form of the proxy encryption key is accessed from the protected cache. This means that the base key store 210 may be designed for lower frequency accesses of a base encryption key (e.g., a traditional cloud storage service), whereas the application 202 may perform much higher frequency operations using the proxy encryption key. Thus, the principles described herein act as a frequency amplifier that allows key-based operations upon the particular data scope to be performed at much higher frequencies than otherwise would be possible by operating directly using the base encryption key. Thus, the application 202 may perform complex and large data accesses on encrypted data requiring high frequency decryption and encryption, as might be the case for a data analytics platform. Thus, highly complex logic may operate using data that is encrypted.

Furthermore, security may be managed at many levels. For instance, authorization to use a base encryption key may be suspended temporarily, which eliminates any chance to operate in the particular data scope after the copy of the proxy encryption key is removed from the protected cache. The base encryption key may also be deleted resulting in eventual garbage collection of even the encrypted proxy encryption key that is stored in the proxy encryption key store. Likewise, a master signing key may be used when making requests to the application that manages the base encryption keys. That master signing key may also be suspended or deleted for the same purpose. To further improve security, a trusted platform service may associate a trusted platform (such as a trusted platform module) with each portion, such that even if an unauthorized user discovered the portion encryption key, they still would not be able to access the portion in the clear without actually being an authorized user of the particular data scope.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A computing system comprising:
    one or more processors;
    one or more computer-readable hardware storage device having thereon computer-executable instructions that are structured such that, when executed by the one or more processors, cause the computing system to perform a method for operating upon encrypted data within a particular data scope for which there is a base encryption key established and stored in a base encryption key store that stores base encryption keys for a plurality of data scopes so as not to thereafter reveal the base encryption key to the computing system, the method comprising:
    causing a base encryption key to be established, associated with the particular data scope, and stored in a base encryption key store
    establishing a proxy encryption key that is also associated with the particular data scope;
    causing the proxy encryption key to be encrypted using the base encryption key;
    storing the encrypted proxy encryption key in a proxy encryption key store;
    performing a plurality of operations using the encrypted proxy encryption key,
        a first operation of the plurality of operations involving accessing the encrypted proxy encryption key from the proxy encryption key store, acquire a decrypted form of the proxy encryption key that was decrypted using the base encryption key, and storing the decrypted form of the proxy encryption key in protected cache,
        the remainder of the plurality of operations using the cached decrypted form of the proxy encryption key to perform the respective remainder of the plurality of operations; and
    after the plurality of operations are performed, removing the decrypted form of the proxy encryption key from the protected cache.

2. The computing system in accordance with claim 1, the act of acquiring the decrypted form of the proxy encryption key comprising:
    sending a request to an application that manages the base encryption key store to decrypt the encrypted proxy encryption key, and receiving the decrypted form of the proxy encryption key from the application that may also manage the base encryption key store.

3. The computing system in accordance with claim 2, the data scope being an account associated with a particular user entity, the request being signed with a key associated with the particular user entity.

4. The computing system in accordance with claim 1, the plurality of operations comprising operations on different portions of the particular data scope, each different portion stored in encrypted form and being encrypted using a different portion encryption key that is derived from the proxy encryption key, wherein when an operation is performed on a portion of the particular data scope for which there is not presently a portion encryption key available, the portion encryption key is derived from the decrypted form of the proxy encryption key.

5. The computing system in accordance with claim 1, the data scope being a populated file system.

6. The computing system in accordance with claim 5, the first operation of the plurality of operations comprising opening a file of the populated file system, at least some of the remainder of the plurality of operations comprising performing operations on the opened file.

7. The computing system in accordance with claim 1, performing a plurality of operations using the encrypted proxy encryption key, comprising:
    for each of the plurality of operations, checking to see if a decrypted form of a proxy encryption key is already in the protected cache, and if so, performing the operation using the decrypted form of the proxy encryption key that is already in the protected cache, and if not, acquiring a decrypted form of the proxy encryption key from an application that manages the base encryption key store and that decrypts the encrypted proxy encryption key using the base encryption key.

8. The computing system in accordance with claim 1, the data scope being an account associated with a particular user entity.

9. The computing system in accordance with claim 8, the method further comprising the following prior to establishing the proxy encryption key:
    authenticating the particular user entity; and
    receiving authorization from the particular user entity to establish proxy encryption key.

10. The computing system in accordance with claim 8, the base encryption key being selected by the particular user entity.

11. The computing system in accordance with claim 8, management policy for the base encryption key being selected by the particular user entity.

12. The computing system in accordance with claim 8, management policy for the base encryption key being selected by an application that manages the base encryption key store.

13. The computing system in accordance with claim 8, the proxy encryption key store also storing one or more keys for operation on data outside of the data scope and that is also authorized to be accessed by the particular user entity.

14. The computing system in accordance with claim 1, the base encryption key being selected by an application that manages the base encryption key store.

15. The computing system in accordance with claim 1, the particular data scope comprising data that is stored at the computing system.

16. The computing system in accordance with claim 1, the method further comprising:
    garbage collecting the encrypted proxy encryption key after detecting that the base encryption key has been deleted.

17. The computing system in accordance with claim 1, wherein access to the base encryption key stored in the base encryption key store occurs at a frequency that is at least two orders of magnitude less frequent than the frequency at which the decrypted form of the proxy encryption key is accessed from the protected cache.

18. The computing system in accordance with claim 1, wherein access to the base encryption key stored in the base encryption key store occurs at a frequency that is at least three orders of magnitude less frequent than the frequency at which the decrypted form of the proxy encryption key is accessed from the protected cache.

19. A method for operating upon encrypted data within a particular data scope for which there is a base encryption key established and stored in a base encryption key store that stores base encryption keys for a plurality of data scopes so as not to thereafter reveal the base encryption key to the computing system, the method comprising:

causing a base encryption key to be established, associated with the particular data scope, and stored in a base encryption key store establishing a proxy encryption key that is also associated with the particular data scope;

causing the proxy encryption key to be encrypted using the base encryption key;

storing the encrypted proxy encryption key in a proxy encryption key store;

performing a plurality of operations using the encrypted proxy encryption key, a first operation of the plurality of operations involving accessing the encrypted proxy encryption key from the proxy encryption key store, acquire a decrypted form of the proxy encryption key that was decrypted using the base encryption key, and storing the decrypted form of the proxy encryption key in protected cache, the remainder of the plurality of operations using the cached decrypted form of the proxy encryption key to perform the respective remainder of the plurality of operations; and after the plurality of operations are performed, removing the decrypted form of the proxy encryption key from the protected cache.

20. A computer program product comprising one or more computer-readable hardware storage device having computer-executable instructions that are structured such that, when executed by one or more processors of a computing system, the computing system is caused to perform a method for operating upon encrypted data within a particular data scope for which there is a base encryption key established and stored in a base encryption key store that stores base encryption keys for a plurality of data scopes so as not to thereafter reveal the base encryption key to the computing system, the method comprising:

causing a base encryption key to be established, associated with the particular data scope, and stored in a base encryption key store establishing a proxy encryption key that is also associated with the particular data scope;

causing the proxy encryption key to be encrypted using the base encryption key;

storing the encrypted proxy encryption key in a proxy encryption key store;

performing a plurality of operations using the encrypted proxy encryption key, a first operation of the plurality of operations involving accessing the encrypted proxy encryption key from the proxy encryption key store, acquire a decrypted form of the proxy encryption key that was decrypted using the base encryption key, and storing the decrypted form of the proxy encryption key in protected cache, the remainder of the plurality of operations using the cached decrypted form of the proxy encryption key to perform the respective remainder of the plurality of operations; and after the plurality of operations are performed, removing the decrypted form of the proxy encryption key from the cache.

* * * * *